United States Patent
Nijhawan et al.

(10) Patent No.: US 6,374,341 B1
(45) Date of Patent: Apr. 16, 2002

(54) APPARATUS AND A METHOD FOR VARIABLE SIZE PAGES USING FIXED SIZE TRANSLATION LOOKASIDE BUFFER ENTRIES

(75) Inventors: Sandeep Nijhawan, San Jose; Denis Gulsen, Redwood City, both of CA (US); John S. Yates, Jr., Needham, MA (US)

(73) Assignee: ATI International SRL, Barbados (BB)

( * ) Notice: Subject to any disclaimer, the term of this patent is extended or adjusted under 35 U.S.C. 154(b) by 0 days.

(21) Appl. No.: 09/146,484

(22) Filed: Sep. 2, 1998

(51) Int. Cl.[7] ................................................ G06F 12/10
(52) U.S. Cl. ...................... 711/207; 711/200; 711/202; 711/203; 711/206
(58) Field of Search ................... 711/207, 200, 711/202, 203, 206, 208, 209

(56) References Cited

U.S. PATENT DOCUMENTS 5,752,275 A * 5/1998 Hammond .................. 711/207
5,963,984 A * 10/1999 Garibay, Jr. et al. ........ 711/206

OTHER PUBLICATIONS

Talluri et al. Tradeoffs in Supporting Two Page Sizes. 19th Annual International Symposium on Computer Architecture (ISCA), May 1992.*
Milenkovic, M. Microprocessor Memory Management Units. IEEE Micro, Apr. 1990.*

* cited by examiner

Primary Examiner—Do Hyun Yoo
Assistant Examiner—Yamir Encarnacion
(74) Attorney, Agent, or Firm—Vedder, Price, Kaufman & Kammholz

(57) ABSTRACT

The present invention provides an apparatus and a method for variable size pages using fixed size TLB (Translation Lookaside Buffer) entries. In one embodiment, an apparatus for variable size pages using fixed size TLB entries includes a first TLB for fixed size pages and a second TLB for variable size pages. In particular, the second TLB stores fixed size TLB entries for variable size pages. Further, in one embodiment, an input of an OR device is connected to the second TLB to provide a cost-effective and efficient implementation for translating linear addresses to physical addresses using fixed size TLB entries stored in the second TLB.

23 Claims, 7 Drawing Sheets

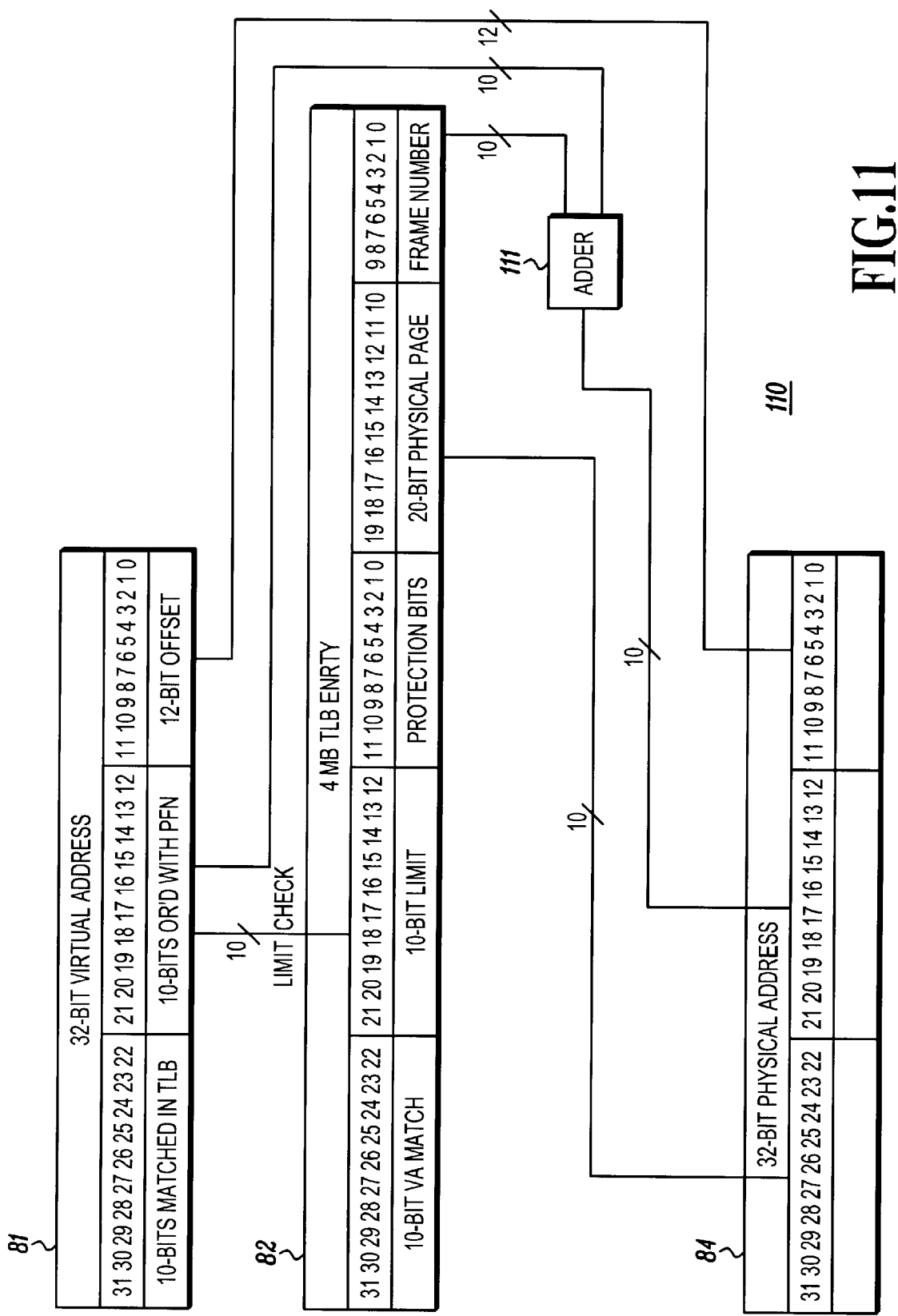

APPARATUS AND A METHOD FOR VARIABLE SIZE PAGES USING FIXED SIZE TRANSLATION LOOKASIDE BUFFER ENTRIES

FIELD OF THE INVENTION

The present invention relates to microprocessors, and in particular, to an apparatus and a method for variable size pages using fixed size translation lookaside buffer entries.

BACKGROUND OF THE INVENTION

Microprocessors typically implement a paging system. For example, the well known Intel X86™ and Intel Pentium™ microprocessors each implement a paging system for fixed size pages. In particular, the Intel Pentium™ microprocessor implements a paging system that provides two fixed-size pages: a 4 K (Kilobyte) page, and a 4 M (Megabyte) page.

Generally, a paging system uses a page directory and a page table to map a linear (or virtual) address to a physical address (i.e., a physical memory address). If a segmentation system is also implemented, then a segment translator is typically provided, which translates a linear address to a linear address and passes the linear address to the paging system (e.g., page translator). For example, in the Intel X86™ microprocessor architecture, a 32-bit linear address includes a 10-bit index into a page directory, a 10-bit index into a page table, and a 12-bit offset within a page. In particular, two levels of page tables are used. The top level page table is called the page directory, which maps the upper 10 bits of the 32-bit linear address to the second level of page tables. The second level of page tables maps the middle 10 bits of the 32-bit linear address to the base address of a page in physical memory (also called a page frame address). The lower 12 bits of the 32-bit linear address represent a 12-bit offset within the page addressed by the page table. Accordingly, the 32-bit linear address is translated into a 32-bit physical address.

Because the translation of a linear address to a physical address can require two additional memory accesses, a microprocessor typically includes a special cache called a TLB (Translation Lookaside Buffer). For example, the Intel X86™ and Intel Pentium™ microprocessors each include a TLB. Generally, the TLB can satisfy many of the requests for reading the page tables. Thus, in the Intel Pentium™ and Intel Pentium Pro™ microprocessor architecture, a TLB for storing entries for 4 K pages and a TLB for storing entries for 4 M pages are both provided.

SUMMARY OF THE INVENTION

Accordingly, the present invention provides an apparatus and a method for variable size pages using fixed size TLB (Translation Lookaside Buffer) entries. In particular, the apparatus and the method of the present invention provide an enhanced and cost-effective paging system with improved performance.

In one embodiment, an apparatus for variable size pages using fixed TLB entries includes a first TLB for fixed size pages and a second TLB for variable size pages. In particular, the second TLB stores fixed size TLB entries for variable size pages while maintaining compatibility with the industry-prevalent Intel x86™/Pentium™ fixed size TLB entries. In a preferred embodiment, the first TLB stores entries for 4 K (Kilobyte) pages, and the second buffer stores fixed 4 M TLB entries for 4 K to 4 M (Megabyte) pages (in 4 K increments aligned at $2^n$ * 4 K physical boundaries).

In this embodiment, an Operating System software (OS) ensures that the following conditions are satisfied: (1) all memory blocks are aligned on a 4 M linear address boundary so that the lower 22 bits of the starting linear address of the memory block are zero; (2) no two such memory blocks are mapped in the same 4 M linear address range; (3) there are no overlapping mappings for the addresses in the first TLB and the second TLB; and (4) the memory block is correctly size-aligned in physical memory go that the lower $\log_2$(least $2^n$>=memory-block-size) offset bits start out as zero. As a result, during the translation of the linear address to the physical address, OR'ing the upper offset of a linear address, which represents the upper 10 bits of the 10+12 bit page offset, with the lower offset of an entry in the second TLB, which represents the lower 10 bits of a 20-bit physical page frame number, generates the middle 10 bits of a physical address (e.g., bits 21:12 of a 32-bit physical address). The upper 10 bits of the 20-bit physical page frame number and the lower 12 bits of the linear address (i.e., the page offset) are then concatenated with the OR'd bits to form the translated physical address.

Accordingly, this embodiment provides a cost-effective and enhanced paging system that implements variable size pages using fixed 4 M TLP entries. Moreover, the apparatus in accordance with this embodiment of the present invention uses a logical OR operation instead of an arithmetic add operation to improve performance during the translation of a linear address to a physical address.

In another embodiment, the fourth condition is not required, and an adder (instead of an OR device) is used to translate a linear address to a physical address. Alternatively, a hardware implementation can use an adder per 4 M TLB entry to compute addresses in parallel with a TLB lookup.

In one embodiment, a method for variable size pages using fixed size TLB entries includes translating a linear address to a physical address using TLB entries stored in a first TLB for fixed size pages, and translating a linear address to a physical address using fixed size TLB entries stored in a second TLB for variable size pages. In particular, the second TLB stores entries for variable size pages using fixed size TLB entries (e.g., fixed 4 M TLB entries for pages of sizes greater than 4 K and less than or equal to 4 M). Further, in this embodiment, the method includes OR'ing an upper offset of a linear address (e.g., bits 21:12 of a 32-bit linear address) with the lower corresponding number of bits of an entry in the second TLB (e.g., bits 9:0 of the physical page frame number) to generate the middle bits of a physical address (e.g., bits 21:12 of a 32-bit physical address) during the translation of the linear address to the physical address using the second TLB.

Other aspects and advantages of the present invention will become apparent from the following detailed description and accompanying drawings.

BRIEF DESCRIPTION OF THE DRAWINGS

FIG. 11 is a functional diagram that illustrates an apparatus and a method for implementing variable size pages using fixed 4 M TLB entries in accordance with another embodiment of the present invention.

DETAILED DESCRIPTION OF THE INVENTION

The present invention provides an apparatus and a method for variable size paging using fixed size TLB (Translation Lookaside Buffer) entries. In particular, a microprocessor that implements a paging system that is compatible with the paging system of the well known Intel X86™/Pentium™ microprocessor (e.g., fixed 4K TLB entries and fixed 4 M TLB entries) would significantly benefit from the apparatus and the method of the present invention. For example, preferred embodiments of an apparatus and a method for variable size pages using fixed 4 M (Megabyte) TLB entries that are compatible with the paging system of the Intel X86™/Pentium™ (e.g., using fixed size TLB entries) are discussed below.

Figure 1:
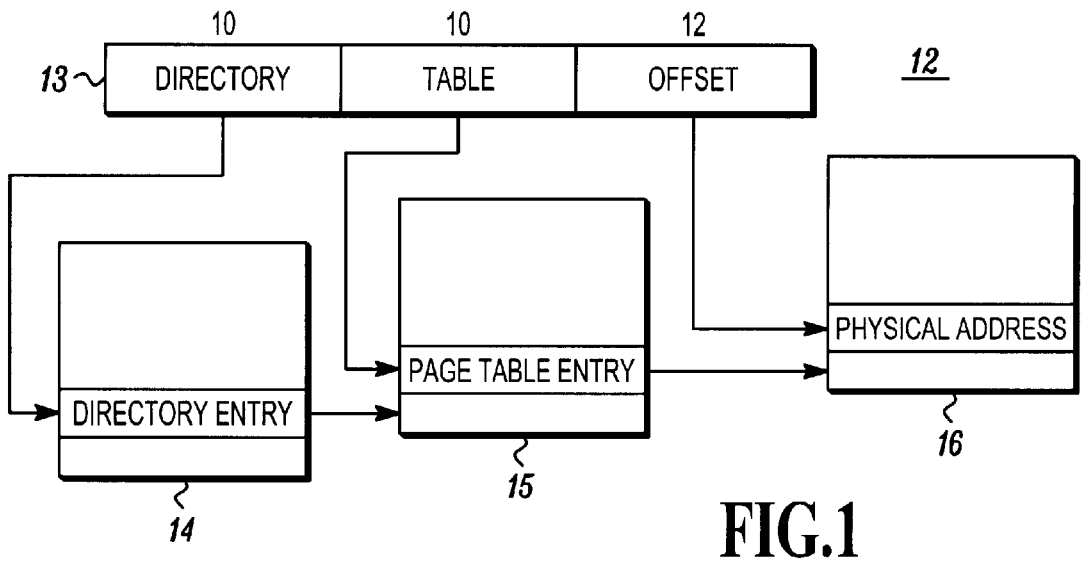
FIG. 1 is a block diagram of a translation of a linear address to a physical address in accordance with one embodiment of the present invention.

FIG. 1 is a block diagram 12 of a translation of a linear address to a physical address in accordance with one embodiment of the present invention. In particular, a paging system translates a linear (or virtual) address to a physical address. Accordingly, when a memory access is necessary (e.g., an instruction fetch or a memory data read or write), a 32-bit linear address 13 is translated to a physical address within page 16 using a directory entry 14 and a page table entry 15. Thus, the program that is currently executing on the microprocessor uses 32-bit addressing to address memory thereby providing the program with the capability of addressing up to 4 G (Gigabytes) of memory space. For example, in a paging system using only fixed 4 K (Kilobyte) pages (and assuming no segment extensions), the microprocessor considers the overall physical memory address space as being 4 G in size divided into $2^{20}$ pages of 4 K each.

Generally, when an OS (Operating System software) initially places a page of code or data related to a particular program in physical memory, it records the start location of the page in a table in memory. The program is not informed of the actual (physical) location of the page of information in memory. When the currently executing program attempts to access any location within the page, the paging system treats the program-generated 32-bit address as a linear address, which is used to index into the page tables in memory to discover where the page of information actually resides in physical memory. In other words, a logical page number is mapped or translated to a physical page number, and then the target physical location within the page can be accessed. Accordingly, a 4 G logical address space can be subdivided into 1,024 page groups (i.e., assuming a paging system using only fixed 4 K pages). In particular, the 32-bit linear address is divided into the following fields:

Directory Bits [31:22] represent the target logical page group (1-of-1,024). This upper 10-bit field of the linear address is used as an index into page directory 14, selecting an entry that points to page table 15. The selected page table 15 maintains the current physical location of the 1,024 pages that make up this page group.

Table Bits [21:12] represent the target page within the page group (1-of-1,024). This middle 10-bit field of the linear address is used as an index into page table 15 associated with this page group. The entry selected by this bit field maintains the current physical location of page 16 in memory.

Offset Bits [11:0] represent the start address within the page for the read or write (1 of-4,096). Thus, this lower 12-bit field of the linear address represents the offset into selected page 16, which thereby provides the physical address after translation as shown in FIG. 1.

In another embodiment, linear address 13 includes 36 address lines (i.e., a 36-bit physical address). Thus, up to 64 G of physical memory can be addressed using the 36 address lines of the linear address 13 in this embodiment (e.g., 4 bits for a segment extension). Further, a larger number of address lines can be used to address a larger size of physical memory. Also, a paging address extension can be used to provide backward compatibility to versions of the paging mechanism using a different (e.g., smaller) number of address lines.

In particular, the OS sets up and maintains the page directory and page tables to track the mapping of logical pages to physical pages. For example, a register is loaded with the 4K-aligned physical base address of the page directory. Each entry (PDE) in the page directory corresponds to a logical page group and contains the base address of the page table associated with that logical page group. There is a page table for each logical page group. Each entry (PTE) in a page table corresponds to a logical page within that logical page group. Each PTE contains the 32-bit base physical address of where the logical page of information was placed in memory by the OS at an earlier point in time (e.g., when the page of information was created or was loaded into memory from a mass storage device). Accordingly, using the translation of a linear address to a physical address as shown in block diagram 12 of FIG. 1, a microprocessor can map any access generated by the currently executing program to any location within 4 G of physical memory.

Accordingly, in this embodiment, a paging system that translates linear addresses to physical addresses is provided. Further, the translation of a linear address to a physical address as shown in FIG. 1 can be accelerated by using a special cache called a TLB (Translation Lookaside Buffer).

In one embodiment, a separate address space outside of the standard 4 G paged address space (e.g., setting a segment extension bit to a predetermined value) is used, and all references to page tables are made as references to this space. Thus, logically all the page tables appear in this space as if they were mapped linearly. There may be TLB misses when referencing this special address space (e.g., a PDE entry is not in place yet). A recursive exception occurs, because a TLB miss is already in progress. Because the access is to a different segment extension address space it goes to a different exception vector. This exception handler then uses bits 21:12 of the failing address to look up a PDE, this time going around the TLB to make a physical access to the page directory. This newly obtained translation is then stored in the TLB. Then the PTE load is restarted and now uses the new TLB entry to read the PTE. Finally, the TLB miss handler completes, and then the original instruction is restarted.

Figure 2:
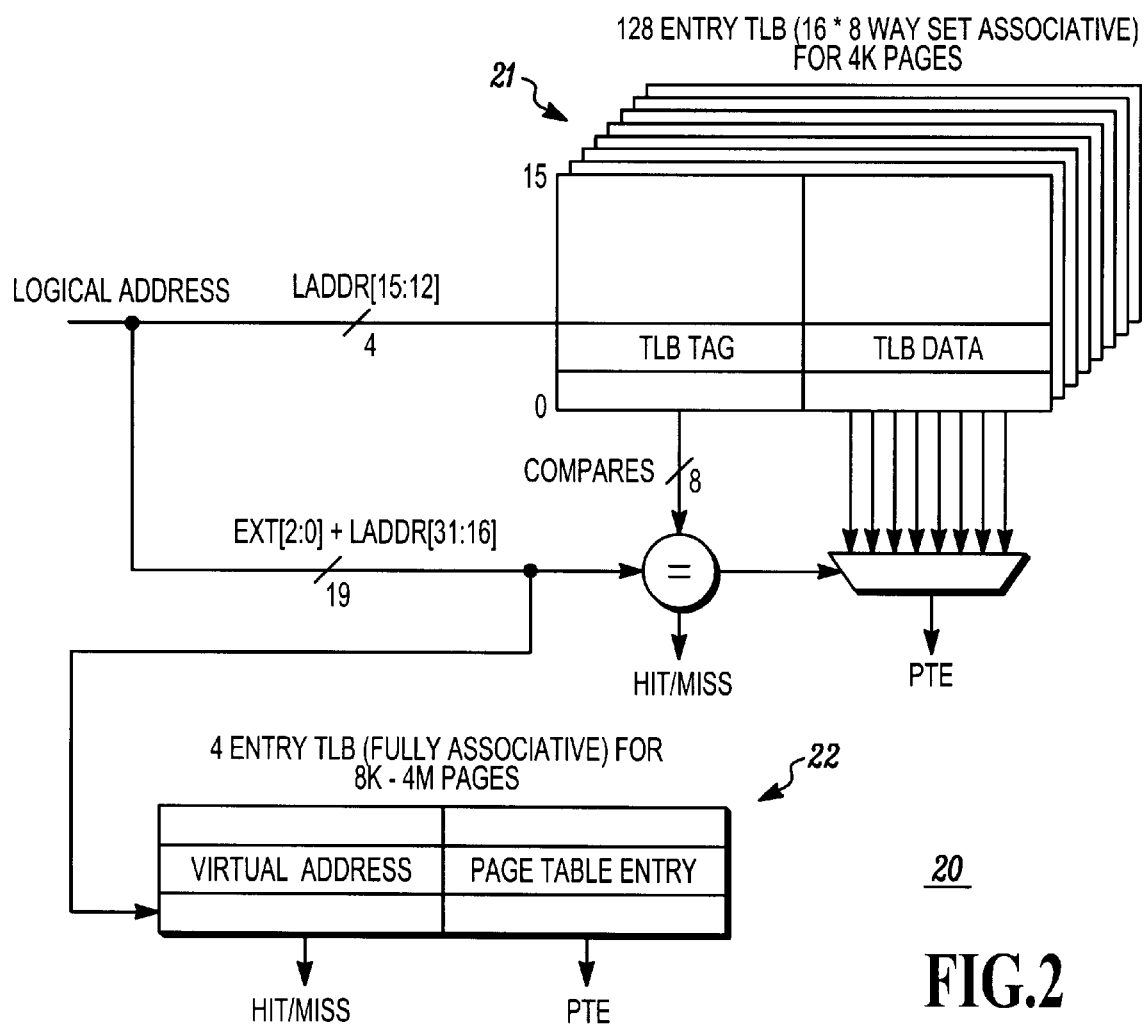
FIG. 2 is a block diagram of a TLB (Translation Lookaside Buffer) for 4 K (Kilobyte) pages and a TLB for 4 M (Megabyte) pages in accordance with one embodiment of the present invention.

FIG. 2 is a block diagram 20 of a TLB 21 for 4K pages and a TLB 22 for variable size pages in accordance with one embodiment of the present invention. Specifically, TLB 21 is a 128-entry 16×8-way set-associative cache for 4K pages, and TLB 22 is a 4-entry fully-associative cache for 4K–4 M pages. TLB 21 is indexed by bits 15:12 of a linear address. Bits 31:16 are used as the tag, and the TLB produces 20 bits of physical address and 13 bits of other information. TLB misses, invalidates, and replacements are performed under the control of standard low-level software using hardware assists (e.g., registers).

More specifically, TLB 21 and TLB 22 implement a paging system in which the native mode (i.e., a native paging system) can be thought of as "living" under the well known Intel X86™/Pentium™ paging system. The Intel X86™/Pentium™ paging system uses a two-level page table as similarly discussed above with respect to FIG. 1. In particular, in the standard Intel X86™ paging system, page tables include a high-level page directory that contains 1,024 page directory entries, each of which refers to a low-level page containing 1,024 page table entries. The PDEs and PTEs of the present invention are similar. As discussed above with respect to FIG. 1, paging translation typically involves reading an entry from a page directory and using that to look up and read a second entry from a page table.

Because translating a linear address to a physical address requires a page directory and a page table lookup as shown in FIG. 1, a program-generated memory access typically results in at least three actual memory references (e.g., one for the page directory entry, one for the page table entry, and one for the accessed data). This three-to-one increase in memory access time is too high a penalty to be acceptable. Accordingly, microprocessors typically include a special cache called a TLB (Translation Lookaside Buffer). In particular, the TLB's tags include linear page frame addresses that had been recently accessed. The TLB data represents the physical page frame address corresponding to the linear page frame address stored in the tag. Also, each tag has a valid bit indicating whether it stores a valid value. If a linear address match has been found in the TLB, but the access is invalid, then a page fault is signaled. If no tag match occurs (i.e., a TLB miss), the page directory and the page table lookup is performed according to the linear address to physical address translation as discussed above with respect to FIG. 1. If the requested linear address is mapped by the page directory/page tables, the new linear to physical mapping is stored in the TLB. Subsequent references to the page containing the linear address may then match in the TLB and avoid the page directory/page table lookup.

Further, in this embodiment, the paging system specifies that if a physical page is written, then a dirty flag of the PTE corresponding to the page is set. Thus, whenever a TLB lookup is performed because of a memory write, the TLB entry comparison also checks to see that the dirty flag of the matching entry is set. If a match occurs, but the dirty flag bit is found clear, then a page directory/page table lookup is initiated just as if it were a TLB miss. However, the dirty flag of the access page table entry is set in the process.

Further, a cache replacement policy is provided for the TLB. The TLB replacement policy can be implemented using a random replacement scheme or using a counter in which the counter counts between zero and the number of elements stored in the TLB as an index of the set element that is to be the next element replaced in the TLB. The counter is incremented every time a memory reference is made. Thus, assuming that it is unlikely that there is a correlation between the number of accesses made and the TLB element replacement request, the counter implementation exhibits a degree of randomness.

In one embodiment, a microprocessor includes two TLBs 21 (e.g., one TLB 21 for instructions and one TLB 21 for data). Further, the microprocessor includes two TLBs 22 for mapping variable size pages (e.g., one TLB 22 for instructions and one TLB 22 for data). In particular, TLP 22 is a 4-entry fully-associative cache that maps 4K–8 M pages in 4K increments aligned at $2^{n}$* 4K physical boundaries.

Figure 3:
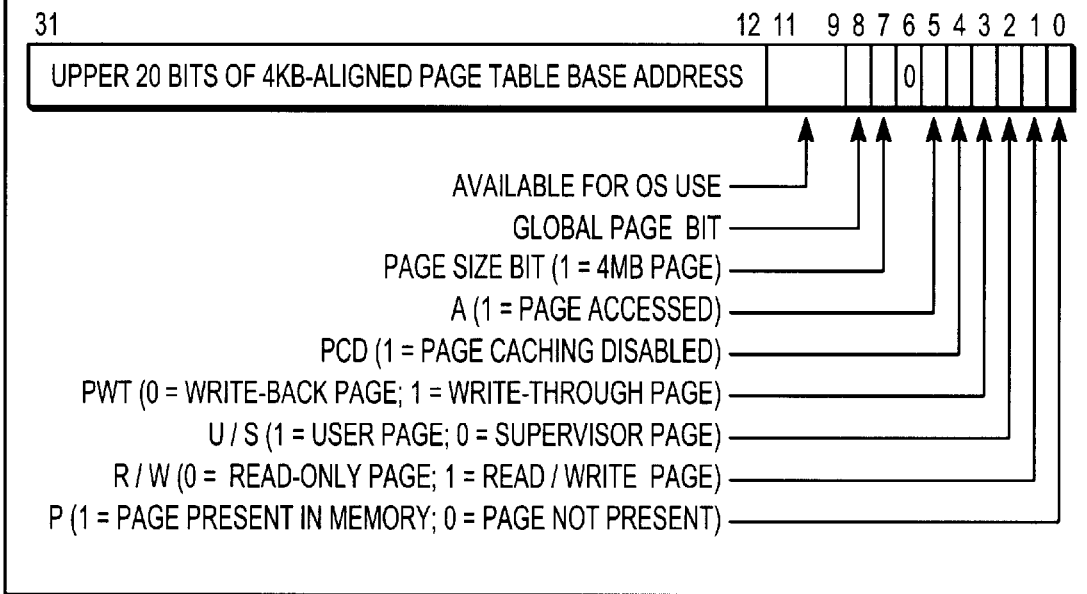
FIG. 3 shows a page directory 32-bit entry format in accordance with one embodiment of the present invention.

FIG. 3 shows a 32-bit page directory entry format in accordance with one embodiment of the present invention. In particular, the upper 20 bits (bits 31:12) represent the 4K-aligned page table base address. Bit 7 represents the page size bit. For example, setting the page size bit to "1" can be used to indicate a 4 M page as shown in FIG. 3. Alternatively, setting the page size bit to one can be used to indicate a variable size page (e.g., an 4K–4 M page) as further discussed below with respect to FIG. 6. The remaining bits (i.e., bits 11:8 and bits 6:0) are identified in FIG. 3 and represent conventional bit assignments.

Figure 4:
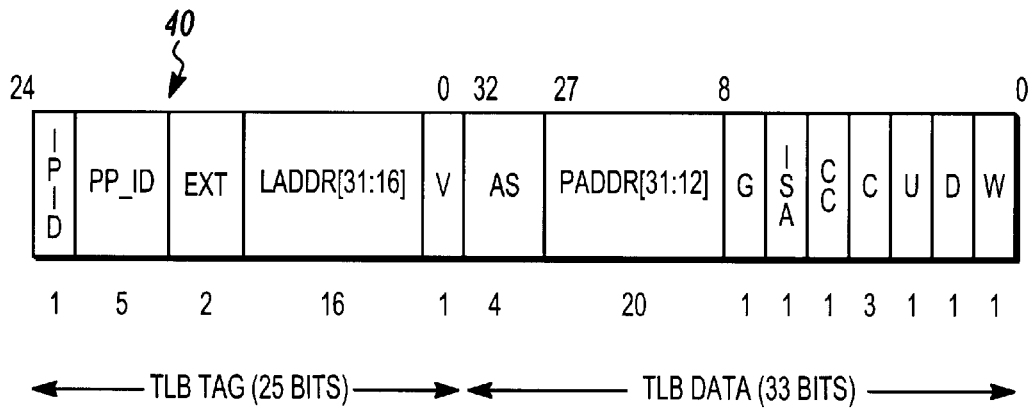
FIG. 4 shows a TLB entry format for 4 K pages in accordance with one embodiment of the present invention.

FIG. 4 shows a 4k TLB entry format (e.g., an entry in TLB 21) in accordance with one embodiment of the present invention. TLB entry 40 includes a TLB tag (25 bits) and TLB data (33 bits). The TLB tag includes the following: 1 bit for a TLB.IPID field that if set, then the matching of a TLB.PP_ID field is ignored (i.e., always considered to be a match); 5 bits for a TLB.PP_ID field that is used for the process ID for native pages and for page properties for Intel X86™ pages; 2 bits for a TLB.EXT field that is the address space extension to search for in the TLB; 16 bits for a TLB.LADDR[31:16] field that is the upper 16 bits of the linear address to search for in the TLB; and 1 bit for a TLB.V field that if set, then the TLB entry is valid. On a TLB match, the TLB data is output. The TLB data includes the following: 4 bits for a TLB.AS[3:0] field that is the address space for a TLB access; 20 bits for a TLB.PADDR[31:12] field that is the upper 20 bits of the physical address for the TLB entry; 1 bit for a TLB.G field that is a copy of the PTE.G (a page table entry field) bit, which software (e.g., the OS) can use to inhibit clearing of the TLB entries when the Intel X86™ PGE bit is set; 2 bits for a TLB.CC field that is for standard execution mode bits; 1 bit for a TLB.C field that is for standard cacheability modes; 1 bit for a TLB.U field that if set, then the TLB entry can be accessed by user-mode programs; 1 bit for a TLB.D field that if set, then the page is marked dirty; and 1 bit for a TLB.W field that if set, then the page is writeable.

Figure 5:
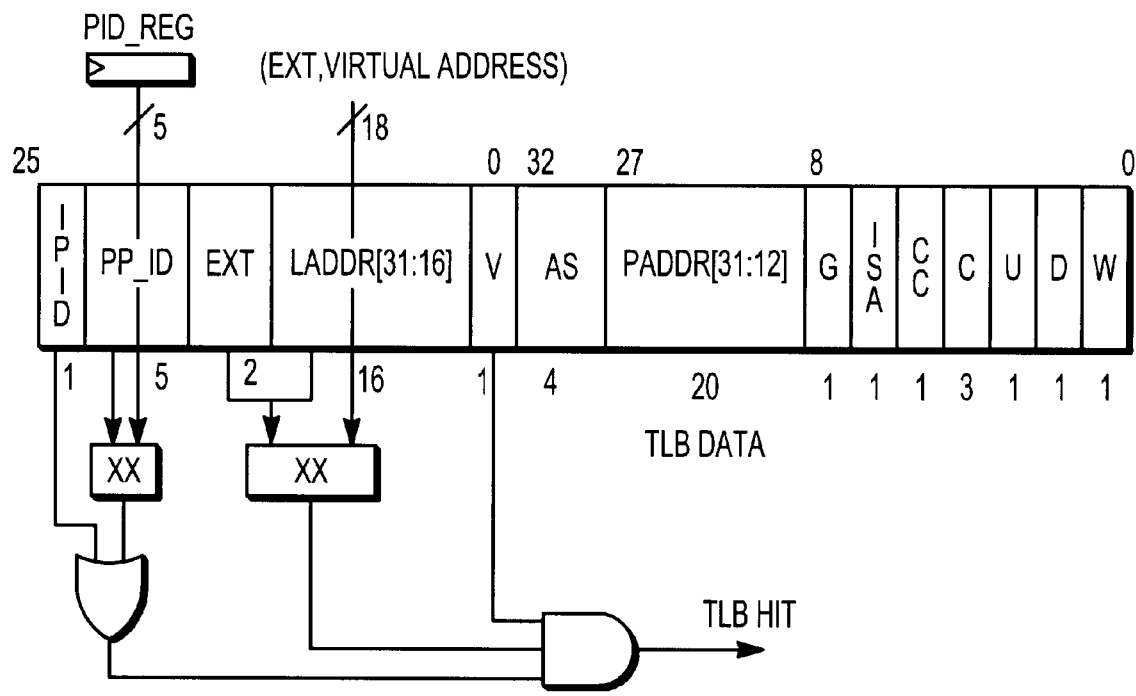
FIG. 5 is a functional diagram of a TLB matching logic function for 4 K pages in accordance with one embodiment of the present invention.

FIG. 5 is a functional diagram 50 of a TLB matching logic function for 4K pages in accordance with one embodiment of the present invention. The TLB.EXT and the TLB.LADDR fields in the TLB (e.g., TLB 21) are compared against the incoming NEXT and linear (or virtual) address. The PID_REG is compared against the TLB.IPID field in the TLB, and the TLB.IPID field is used to force a match in this comparison. A TLB hit is signaled if the entry is valid and the above two comparisons are true.

Accordingly, a paging system for fixed size pages (e.g., 4K pages) using fixed size (e.g., 4K) TLB entries is provided. However, there are several circumstances in which it is desirable to provide pages that are larger in size than 4K and to provide variable size pages. For example, there may be a rather large memory area that requires identical rules of conduct throughout (e.g., is efficiently processed as a defined block of data) such as for a 1 M video frame buffer area. Without the ability to define pages of larger sizes, the OS programmer is forced to setup 256 page table entries, each describing the location and "rules of conduct" or properties within a 4K page in order to cover the entire 1 M memory region, which requires additional programming and also consumes 1K of memory (256 entries, each 4 bytes wide) just to describe 256 contiguous 4K memory regions each with identical rules of conduct. In addition, because the TLB is typically relatively small, a microprocessor can only cache a subset of these 256 table entries in its TLB at a given instant in time. As other pages in memory are accessed, the PTEs previously cached that describe this area are cast out of the TLB to make room for the new page table entries, which results in poor performance the next time one of these cast out pages is accessed. As a result, the microprocessor is forced to consult the page directory and page tables in memory in order to refetch the respective page table entry and recache it in the TLB.

As another example, the OS kernel code (i.e., the core of the OS) is typically kept in memory all the time and is frequently called by other portions of the OS and by application programs. The OS kernel code can assume a rather large region of memory. Without large page size capability, the OS programmer would have to create and maintain a large number of page table entries each describing a 4K area of the OS kernel. As in the previous example, as other pages in memory are accessed, the page table entries previously cached that describe this area are cast out of the TLB to make room for the new page table entries. This results in poor performance the next time one of these cast out pages is accessed. Thus, the microprocessor is forced to consult the page directory and page tables in memory in order to refetch the respective page table entry and recache it in the TLB.

Accordingly, the present invention provides an apparatus and a method for variable size pages, for example, 4K–4 M pages increasing in 4K increments aligned at $2^{n}$* 4K physical boundaries, using fixed size TLB entries (e.g., fixed 4 M TLB entries). In particular, in one embodiment, a microprocessor includes a separate TLB (e.g., TLB 22 of FIG. 2) to cache the fixed size TLB entries for the variable size pages. The first time that an access is made within the variable size page, the page table entry is cached in TLB 22. Any subsequent accesses within the same variable size page may then result in a TLB 22 hit thereby increasing performance. Page table entries for 4K pages are cached in TLB 21. Therefore, caching 4K pages does not cause a cast out from TLB 22, which is for the variable size pages, or vice versa.

Figure 6:
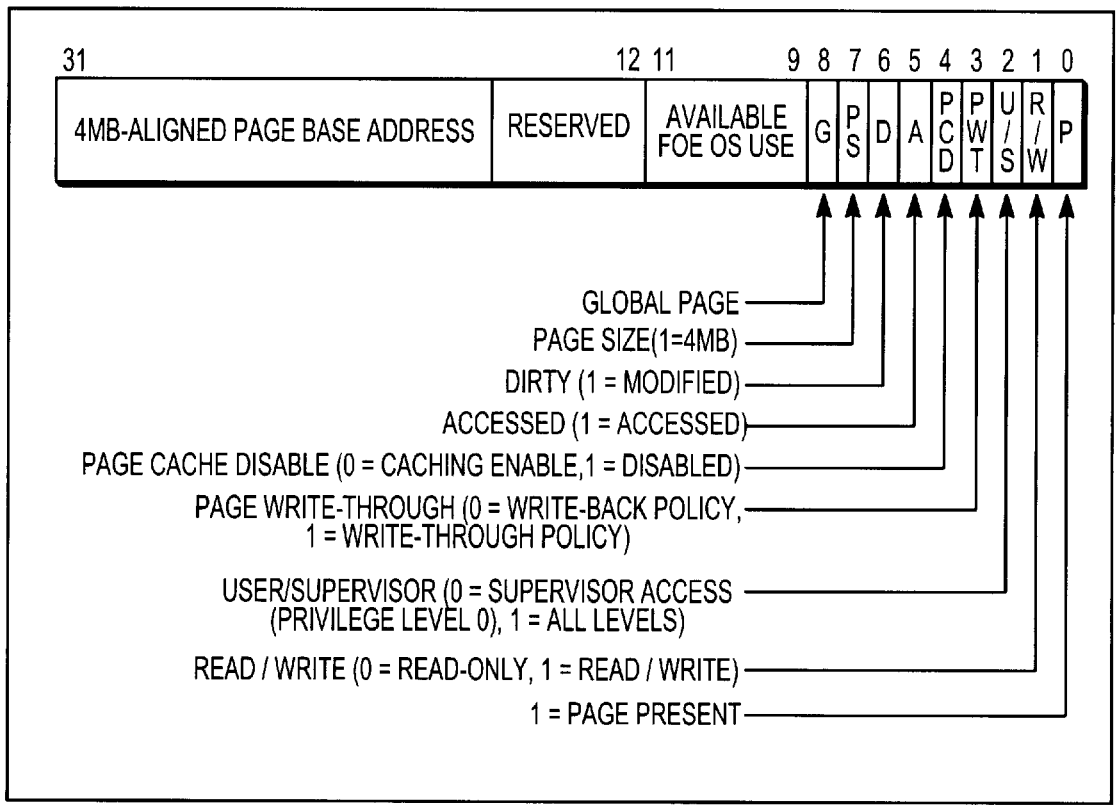
FIG. 6 shows a format of a page directory entry for 4 M pages in accordance with one embodiment of the present invention.

FIG. 6 shows a page directory entry format 60 for 4 M pages in accordance with one embodiment of the present invention. In particular, bits 31:12 represent the 4 M-aligned page base address and also include reserved bits. Bit 7 represents the page size bit, which can be set to one to indicate a variable size page (e.g., a page size greater than or equal to 4K increasing in 4K increments aligned at $2^{n}$* 4K physical boundaries). It should be apparent to those skilled in the art that entry 60 is similar in format to entry 30, which is an example of the native paging system living under the standard Intel X86™/Pentium™ paging system. The remaining bits are identified in FIG. 5 and represent conventional bits.

Figure 7:
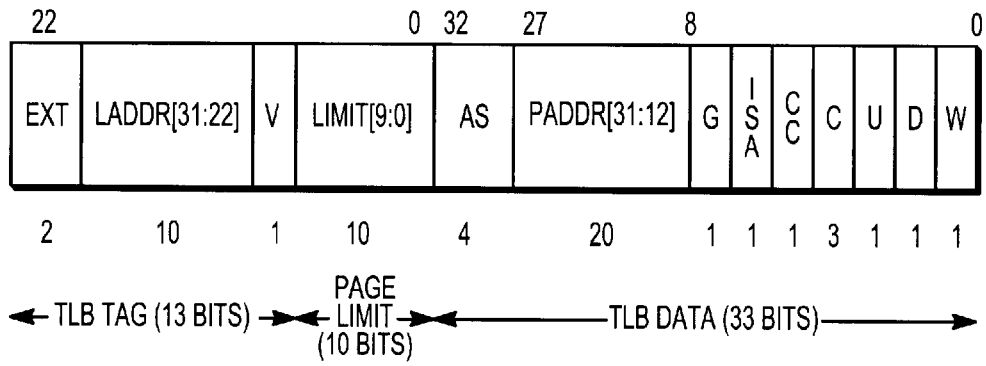
FIG. 7 shows a TLB entry format for variable size pages in accordance with one embodiment of the present invention.

FIG. 7 shows a TLB entry format 70 for variable size pages in accordance with one embodiment of the present invention. TLB entry 70 includes a TLB tag (13 bits), a page limit (10 bits), and TLB data (33 bits). The TLB tag includes the following: 2 bits for a TLB.EXT field that is the address space extension to search for in the TLB; 10 bits for a TLB.LADDR[31:22] field that is the upper 10 bits of the linear address to search for in the TLB; and 1 bit for a TLB.V field that if set, then the TLB entry is valid. On a TLB match, the TLB data is output. The TLB data includes the following: 4 bits for a TLB.AS[3:0] field that is the address space for a TLB access; 20 bits for a TLB.PADDR[31:12] field that is the upper 20 bits of the physical address for the TLB entry; and the lower 9 bits are as described above with respect to the lower 9 bits of 4K TLB entry 40. The 10-bit limit field is used to define the page size. For example, if the 10 bit limit field equals 0000000000, then the page size equals 4K, if the 10-bit limit field equals 0000000001, then the page size equals 8K, if the 10-bit limit field equals 0000000011, then the page size equals 16K, if the 10-bit limit field equals 0000000111, then the page size equals 32K, if the 10-bit limit field equals 0000001111, then the page size equals 64K, if the 10 bit limit field equals 0000011111, then the page size equals 128K, etc., and if the 10-bit limit field equals 1111111111, then the page size equals 4 M.

Figure 8:
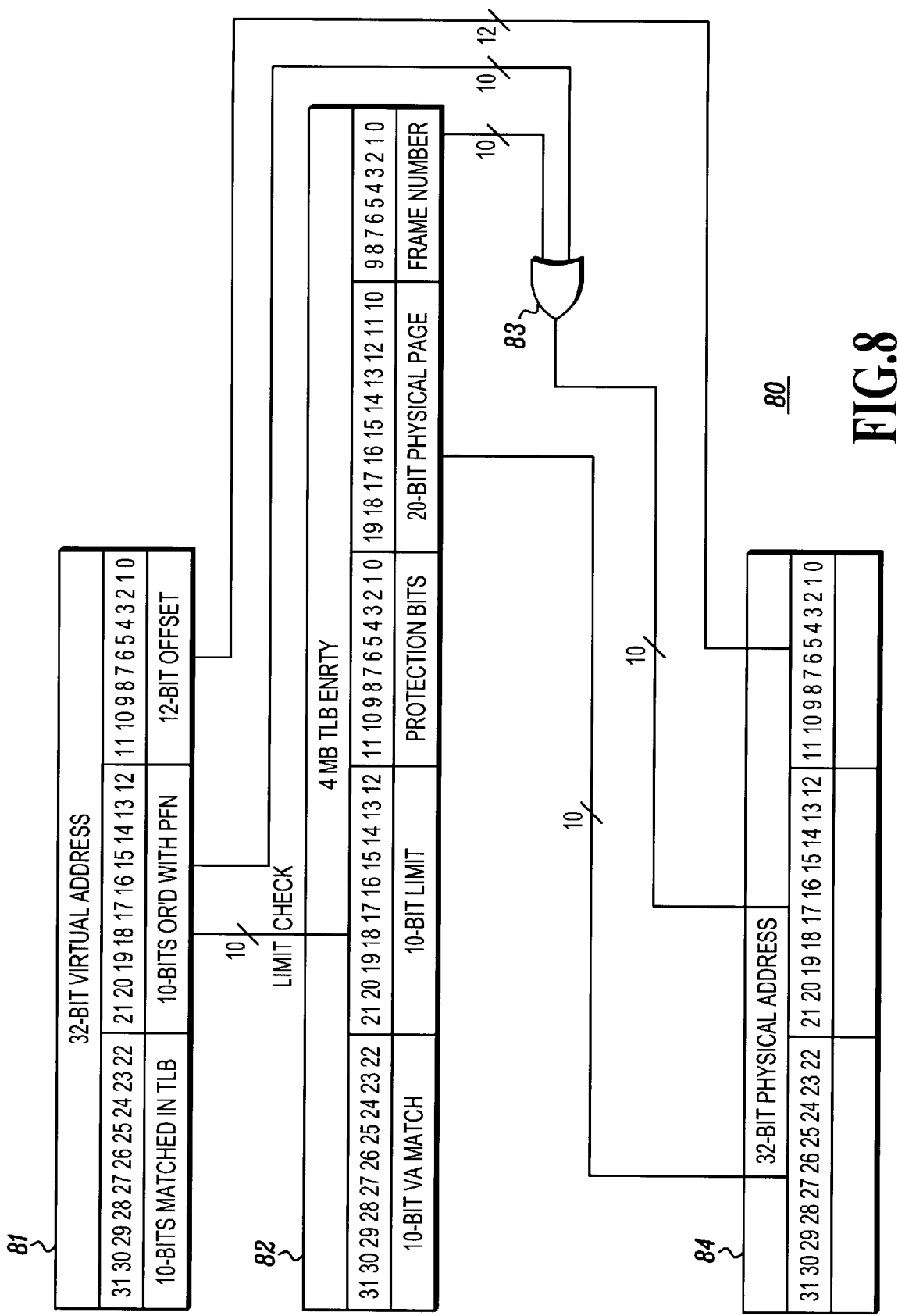
FIG. 8 is a functional diagram of a translation of a 32-bit linear address to a 32-bit physical address for a variable size page using a fixed 4 M TLB entry and an OR device in accordance with one embodiment of the present invention.

FIG. 8 is a functional diagram 80 of a translation of a 32-bit linear (or virtual) address 81 to a 32-bit physical address 84 using a fixed 4 M TLB entry 82 and an OR device 93 in accordance with one embodiment of the present invention. The 32-bit linear address 81 includes a 10-bit page number, bits 31:22, and a 10+12 bit offset, bits 21:0. The lower 12 bits of the 10+12 bit offset, bits 11:0, provide an offset within a page. The upper 10 bits of the 10+12 bit offset, bits 21:12, may be extensions of either the page number or the offset within a page, depending on the page size of the page being mapped by 32-bit linear address 81. For example, if the page being mapped by 32-bit linear address 81 is an 8K page, then the upper 9 bits of the 10+12 bit offset can be used to define the page number such that a 19-bit logical page number is provided and a 13-bit offset is provided as an offset within the 8K page. If the page being mapped by 32-bit linear address 81 is a 4 M page, then all of the upper 10 bits of the 10+12 bit offset can be used as an extension to the offset such that a 10-bit logical page number is provided and a 22-bit offset is provided as an offset within the 4 M page. Accordingly, pages of sizes between 4K and 4 M can be mapped with 4K granularity using 32-bit linear address 81.

Further, 32-bit linear address 81 can be translated using fixed 4 M TLB entry 82 (e.g., stored in TLB 22). In particular, the upper 10 bits of 32-bit linear address 81, bits 31:22, are matched with the upper 10 bits of TLB entry 82, bits 31:22, as further discussed below. Also, 32-bit linear address 81 includes a 10+12 bit page offset which provides an offset into a physical page of memory as discussed above. Specifically, bits 21:12 represent the upper 10 bits of the 10+12 bit page offset of 32-bit linear address 81 and are used as a limit check which is done by hardware in parallel with the TLE lookup (e.g., ensuring that pages smaller than 4 M with 4K granularity can be mapped by 4 M TLB entry 82). More specifically, a hardware exception is generated if bits 21:12 of linear address 81 are greater than the 10-bit limit programmed in the 4 M TLB entry 82. For example, to map a 64K block, the OS would program the 10-bit limit in the 4 M TLB entry 82 to be 0xF (i.e., 64K is 16 4K pages), and to map a 4 M block, the OS would program the 10-bit limit in the 4 M TLB entry 82 to be 0xFF (i.e., all 1's).

In one embodiment, 4 M TLB entry 82 is stored in TLB 22, and TLB 22 is connected to an input of OR device 83. Bits 31:22 of 4 M TLB entry 82 provide the 10-bit linear address match. Bits 21:12 of 4 M TLB entry 82 are used for the limit check as discussed above. The next 12 bits of 4 M TLB entry 82, bits 11:0, provide standard protection bits. The lower 20 bits of 4 M TLB entry 82, bits 19:0, provide the 20-bit physical page frame number.

Assuming the four conditions described further below are implemented, translation of 32-bit linear address 81 to 32-bit physical address 84 using 4 M TLB entry 82 and OR device 83 (e.g., a standard bitwise OR gate) is provided as follows. In particular, bits 21:12 of 32-bit linear address 81 are OR'd with the lowest 10 bits of the 20-bit physical page frame number, bits 9:0, of 4 M TLB entry 82 using OR device 83 to provide bits 21:12 of 32-bit physical address 84. Bits 19:10 of the 20-bit physical page frame number of 4 M TLB entry 82 provide the upper 10 bits, bits 31:22, of 32-bit physical address 84. Finally, the lower 12 bits of 32-bit linear address 81 provide the 12-bit offset and therefore provide the lower 12 bits, bits 11:0, of 32-bit physical address 84.

Figure 9:
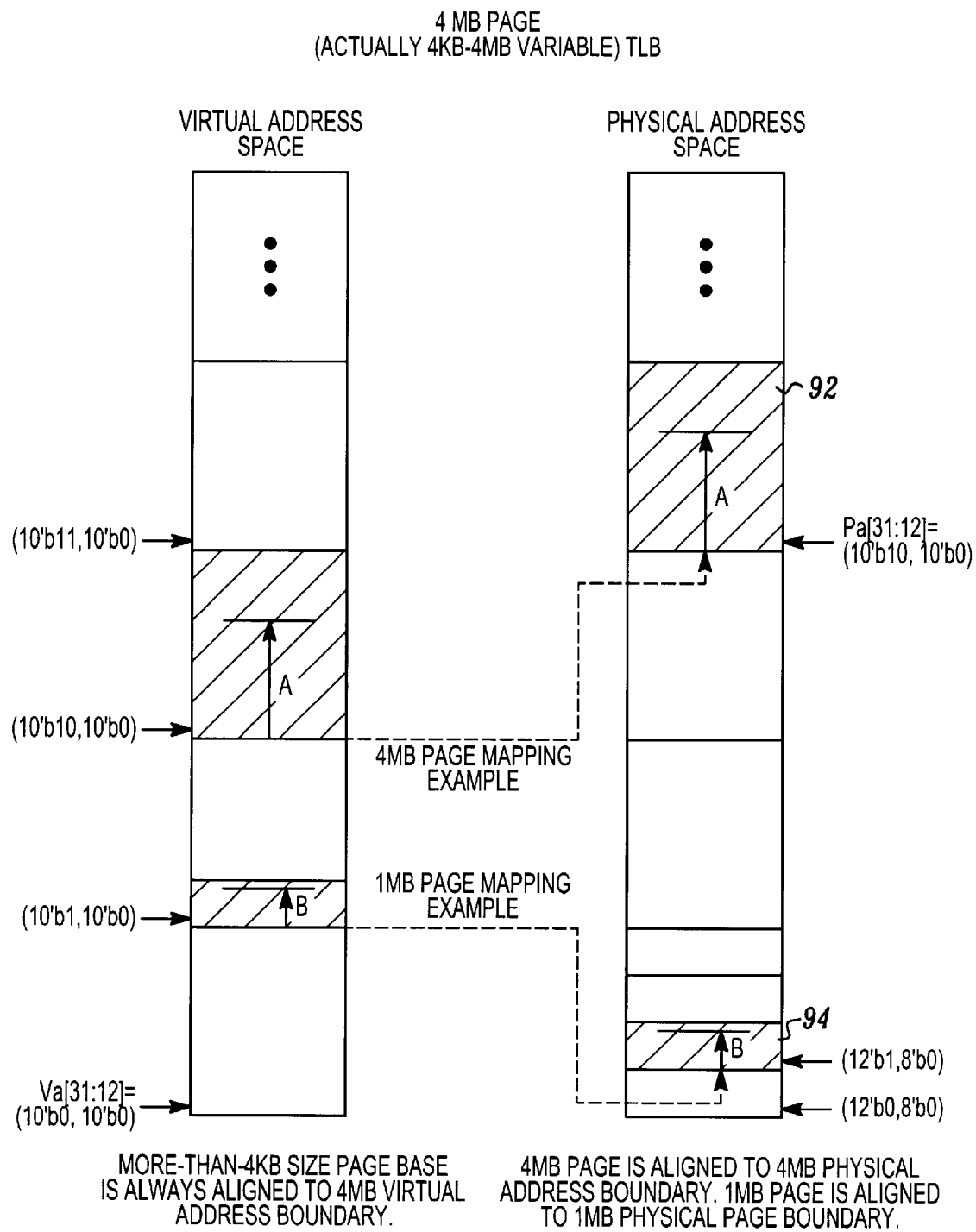
FIG. 9 is a block diagram representing logical and physical memory page alignment in accordance with one embodiment of the present invention.

In particular, the linear address translation illustrated in FIG. 8 using OR device 83 requires that the following conditions be maintained: (1) all memory blocks are aligned on a 4 M linear address boundary as shown in FIG. 9 so that the lower 22 bits of the starting linear address of such a block are zero; (2) no two such memory blocks are mapped in the same 4 M linear address range; (3) there are no overlapping mappings for these addresses in the 4 M and 4K TLBs (e.g., TLB 21 and TLB 22); and (4) the block of memory is correctly size-aligned in physical memory as shown in FIG. 9 so that the lower $\log_2$(least $2^n$>=memory-block-size) offset bits start out as zero. The last condition allows a hardware implementation to OR the upper 10 bits of the 10+12 bit page offset of 32-bit linear address 81 with the lower 10 bits of a 20-bit physical page frame number of 4 M TLB entry 82 using OR device 83. Thus, the upper 10 bits of the physical page frame number of 4 M TLB entry 82 and the lower 12 bits of linear address 81 are concatenated with the output of OR device 83 to form 32-bit physical address 84.

Alternatively, the fourth condition need not be maintained if an adder 111 is used instead of OR device 83 as further discussed below with respect to FIG. 11.

Accordingly, the present invention provides an apparatus and a method for variable size pages using fixed size TLB entries. For example, FIG. 8 provides one embodiment of an apparatus and a method for variable size pages (i.e., 4K–4 M pages with 4K granularity) using 4 M TLB entries. Further, FIG. 8 provides a more cost-effective and efficient implementation by providing an OR device 83 instead of an adder (e.g., adder 111 of FIG. 11) to compute bits 21:12 of 32-bit physical address 84 using 4 M TLB entry 82.

In one embodiment, an OS (i.e., operating system software executing on the microprocessor) implements the four conditions discussed above. In particular, the fourth condition, as described above, allows for the OR'ing of bits from linear address 81 into physical address 84. For example, when allocating memory from Microsoft Windows™, the required alignment can be guaranteed by allocating twice as much needed, locking the correct amount down in Microsoft Windows™, mapping it, and freeing the rest of the allocated memory if possible. For example, to map a 40K block of physical memory using a memory allocator of an OS such as Microsoft Windows™, 128K of memory can be allocated. Thus, within the allocated 128K of memory, the OS inherently maps a 64K block of memory that resides in physical memory on 64K boundaries, which can be used for the desired 40K block, and then the extra memory on either side of the 64K boundaries can be reallocated. As another example, block 92 of FIG. 9 is a 4 M block that resides in physical memory on 4 M boundaries, which can be allocated (e.g., as similarly described in the above example) for storing a block A of memory that is greater than 2 M in size but less than or equal to 4 M in size, and block 94 of FIG. 9 is a 1 M block that resides in physical memory on 1 M boundaries, which can be allocated (e.g., as similarly described in the above example) for storing a block B of memory that is greater than 500K (0.5 M) in size but less than or equal to 1 M in size.

Figure 10:
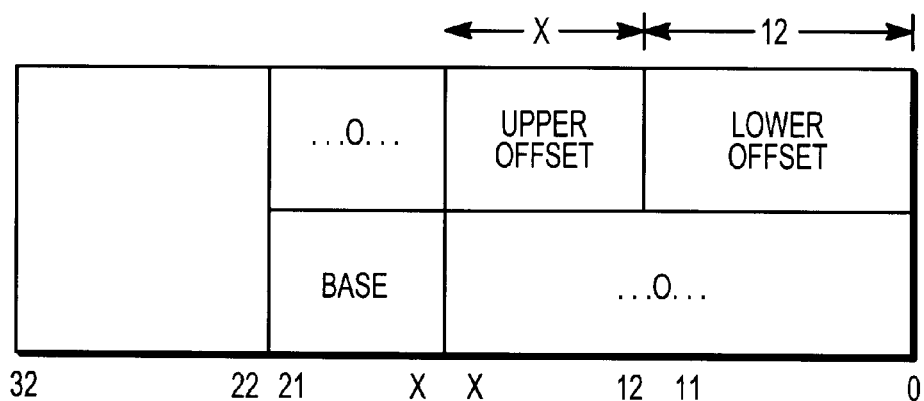
FIG. 10 shows a representation of the upper offset and the lower offset of the linear address of FIG. 8 in comparison with the physical page frame number of the TLB entry of FIG. 8 in accordance with one embodiment of the present invention.

FIG. 10 shows a representation of the upper offset and the lower offset of linear address 81 in comparison with the physical page frame number of TLB entry 82 in accordance with one embodiment of the present invention. In particular, as discussed above, bits 21:12 of 32-bit linear address 81 are OR'd with bits 9:0 of 4 M TLB entry 82 using OR device 83 to provide bits 21:12 of 32-bit physical address 84. Bits 21:12 of 32-bit linear address 81 can be used as an upper offset in addition to the lower offset or 12-bit offset (i.e., bits 11:0) of 32-bit linear address 81. Condition four discussed above with respect to FIG. 8 requires that the OS ensure that the block of memory being mapped is correctly size-aligned in physical memory on a boundary to the next higher power of base two of the block of memory being mapped. For example, for a 40K page or a 40K block of memory being mapped, the OS ensures that the block of memory being mapped is correctly aligned in physical memory to a 64K physical boundary. This condition allows for the OR'ing of bits from linear address 81 to physical address 84. In particular, for variable size pages, the number of upper offset bits required to index into the page depends on the page size. In one embodiment, page sizes range from 4K to 4 M (in 4K increments aligned at $2^n$* 4K physical boundaries). Thus, the upper offset ranges from $2^{12}$ to $2^{21}$. As shown in FIG. 10, the upper offset is bounded by $2^x$. Thus, applying condition four, if a block of memory or page size is desired to be in the range of $2^{x-1}$ up to $2^x-1$, then the OS ensures that the block of memory or page being mapped is correctly size-aligned in physical memory to a $2^x$K physical boundary. Accordingly, the 20-bit physical page frame number of 4 M TLB entry 82 would include a physical base in which bits 22:x+1 are used to define the physical boundary of the page in physical memory. Thus, bits x:0 of the 20-bit physical page frame number of 4 M TLB entry 82 are zero. Also, by requiring condition four, which requires that a variable size page be size-aligned in physical memory on a boundary of $2^x$ for a page or block of memory of the size of $2^{x-1}$ up to $2^x-1$ only X bits are required to offset within (map) the page or block of memory. Thus, bits 22:x are not needed for offset bits for a page or block of memory of the size between $2^{x-1}$ and $2^x-1$. As a result, OR'ing the upper offset, bits x:12, with the non-zero base, bits 21:x+1, correctly provides bits 21:12 of 32-bit physical address 84.

FIG. 11 is a functional diagram 110 that illustrates an apparatus and a method for implementing variable size pages using fixed 4 M TLB entries in accordance with another embodiment of the present invention. In particular, functional diagram 110 includes an adder 111 that adds bits 21:12 of 32-bit linear address 81 with bits 9:0 of the 20-bit physical page frame number of 4 M TLB entry 82 and outputs bits 21:12 of 32-bit physical address 84. Thus, because adder 111 is used to provide bits 21:12 of 32-bit physical address 84, this embodiment does not require that the block of memory be size-aligned in physical memory so that the lower $\log_2$(least $2^n$>=memory-block-size) offset bits start out as zero. In other words, this embodiment does not require that the OS ensure that the page (or the block of memory) being mapped is aligned in physical memory as required by condition four as discussed above with respect to FIG. 8.

Accordingly, the apparatus and the method in accordance with the preferred embodiments of the present invention provide variable size paging using fixed size TLB entries. Further, the preferred embodiments provide an enhanced and efficient paging system that is also compatible with the standard Intel X86™/Pentium™ paging system.

Moreover, variable size pages are advantageous in a variety of situations. For example, the present invention allows for the mapping of all of the text and data of a real-time process with a single TLB entry. This reduces mapping setup time and also reduces the number of TLB entries to be invalidated during a context switch. When mapping pages (or blocks of memory) that exceed the capacity of the 4K TLB (e.g., TLB 21, which has a capacity of 128 entries or 512K), it would reduce TLB missed processing overhead. As another example, the present invention allows for the mapping of OS kernel text and data into each process with a single TLB entry. As further examples, the present invention allows for making the frame buffer available to a graphics process with memory protection and without having to switch segments, or mapping large sequential buffers using minimum TLB entries thereby reducing TLB missed processing overhead, which is advantageous for video and 3 D (Dimensional) graphics processing.

Further, one embodiment of the present invention uses an OR device (e.g., OR device 83) for translating a linear address to a physical address using a fixed 4 M TLB entry. Hence, this embodiment provides a cost-effective and efficient implementation for a linear address to a physical address translation using a TLB (e.g., TLB 22).

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. An apparatus comprising:
   a first translation lookaside buffer for fixed size pages;
   a second translation lookaside buffer for variable size pages; and
   an OR device, an input of the OR device connected to the second translation lookaside buffer, wherein the OR device is provided for translating a linear address to a physical address using a fixed size translation lookaside buffer entry stored in the second translation lookaside buffer;
   wherein the fixed size translation lookaside buffer entry comprises an n-bit physical page frame number; and wherein the OR device provides an OR function of a first input, which is a lower k bits of the n-bit physical page frame number, and a second input, which is an upper k bits of an offset of the linear address, and the OR device outputs k bits forming a portion of the physical address for a translation of the linear address to the physical address.

2. The apparatus of claim 1 wherein the fixed size pages are 4 kilobyte pages.

3. The apparatus of claim 1 wherein the first translation lookaside buffer is a 128-entry 16×8 way set-associative translation lookaside buffer for 4 kilobyte pages.

4. The apparatus of claim 1 wherein the second translation lookaside buffer is a 4-entry fully-associative translation lookaside buffer for variable size pages, wherein the variable size pages are larger in size than 4 kilobytes and less than or equal in size to 4 megabytes.

5. The apparatus of claim 1 wherein the second translation lookaside buffer stores a translation lookaside buffer entry, wherein the translation lookaside buffer entry comprises a 10-bit limit for defining the page size limit.

6. The apparatus of claim 5 wherein the translation lookaside buffer entry further comprises a 10-bit linear address match and a 20-bit physical page frame number.

7. The apparatus of claim 6 wherein the OR device provides an OR function of a first input, which is a lower 10 bits of the 20-bit physical page frame number, and a second input, which is an upper 10 bits of an offset of a linear address, and the OR device outputs 10 bits of a physical address for a translation of the linear address to the physical address.

8. An apparatus comprising:
   a first translation lookaside buffer for fixed size pages;
   a second translation lookaside buffer for variable size pages, the second translation lookaside buffer stores a translation lookaside buffer entry comprising a 10-bit limit for defining the page size limit, a 10-bit linear address match and a 20-bit physical page frame number; and
   an adder, wherein the adder adds a first input, which is a lower 10 bits of the 20-bit physical page frame number, and a second input, which is an upper 10 bits of an offset of a linear address, and the adder outputs 10 bits of a physical address for a translation of the linear address to the physical address.

9. A method comprising:
   translating a linear address to a physical address using an entry in a first translation lookaside buffer, wherein the first translation lookaside buffer stores entries for fixed size pages; and
   translating a linear address to a physical address using a fixed size entry in a second translation lookaside buffer, wherein the second translation lookaside buffer stores fixed size entries for variable size pages, wherein the translating uses an OR function of the fixed size entry in the second translation lookaside buffer;
   wherein the fixed size entry in the second translation lookaside buffer comprises an n-bit physical page frame number; and wherein the translating uses an OR function of a first input, which is a lower k bits of the n-bit physical page frame number, and a second input, which is an upper k bits of an offset of the linear address, and provides an output of k bits forming a portion of the physical address for translating the linear address to the physical address.

10. The method of claim 9 further comprising:
    setting a page size bit of a page directory entry to indicate a variable size page.

11. The method of claim 9 further comprising:
    mapping a variable size page to physical memory such that the page is size-aligned in physical memory to the next highest base-power-two physical boundary.

12. The method of claim 9 wherein said translating uses an OR function comprises:

translating a linear address to a physical address using an OR function of a first input, which is a lower 10 bits of a 20-bit physical page frame number of the fixed size entry stored in the second translation lookaside buffer, and a second input, which is an upper 10 bits of an offset of a linear address, to provide 10 bits of a physical address.

13. The method of claim 9 further comprising:

mapping a variable size page to a 4 megabyte linear address boundary such that the lower 22 bits of a starting linear address of the page are zero, and no other page is mapped in the same 4 megabyte logical address space.

14. The method of claim 9 further comprising:

ensuring that there are no overlapping mappings in the first translation lookaside buffer and the second translation lookaside buffer.

15. The method of claim 9 wherein the first translation lookaside buffer is for 4 kilobyte pages.

16. The method of claim 9 wherein the second translation lookaside buffer is for pages between 8 kilobytes and 4 megabytes in size, and the second translation lookaside buffer stores fixed 4 megabyte translation lookaside buffer entries.

17. A method comprising:

translating a linear address to a physical address using an entry in a first translation lookaside buffer, wherein the first translation lookaside buffer stores entries for fixed size pages;

translating a linear address to a physical address using a fixed size entry in a second translation lookaside buffer, wherein the second translation lookaside buffer stores fixed size entries for variable size pages; and translating a linear address to a physical address by adding a first input, which is a lower 10 bits of a 20-bit physical page frame number of the fixed size entry stored in the second translation lookaside buffer, and a second input, which is an upper 10 bits of an offset of a linear address, to provide a 10-bit output, and concatenating an upper 10 bits of the physical page frame number of the fixed size entry stored in the second translation lookaside buffer and a lower 12 bits of the offset of the linear address with the 10-bit output to provide the physical address.

18. A method for implementing variable size pages using fixed size translation lookaside buffer entries, the method comprising;

storing a fixed 4 megabyte translation lookaside buffer entry in a first translation lookaside buffer for variable size pages;

translating a 32-bit linear address to a 32-bit physical address using the fixed 4 megabyte translation lookaside buffer entry; and translating the 32-bit linear address to the 32-bit physical address using an OR function of a first input, which is a lower 10 bits of a 20-bit physical page frame number of the fixed 4 megabyte translation lookaside buffer entry, and a second input, which is an upper 10 bits of an offset of the 32-bit linear address, to provide 10 bits of the 32-bit physical address.

19. The method of claim 18 wherein the first translation lookaside buffer stores fixed 4 megabyte translation lookaside buffer entries for pages between 8 kilobytes and 4 megabytes in size.

20. The method of claim 18 further comprising:

translating the 32-bit linear address to the 32-bit physical address using a fixed 4 kilobyte translation lookaside buffer entry stored in a second translation lookaside buffer for 4 kilobyte pages.

21. The method of claim 18 further comprising:

performing a limit check using a 10-bit limit of the fixed 4 megabyte translation lookaside buffer entry.

22. A method for implementing variable size pages using fixed size translation lookaside buffer entries, the method comprising:

storing a fixed 4 megabyte translation lookaside buffer entry in a first translation lookaside buffer for variable size pages;

translating a 32-bit linear address to a 32-bit physical address using the fixed 4 megabyte translation lookaside buffer entry; and translating the 32-bit linear address to the 32-bit physical address by adding a first input, which is a lower 10 bits of a 20-bit physical page frame number of the fixed 4 megabyte translation lookaside buffer entry, and a second input, which is an upper 10 bits of an offset of the 32-bit linear address, to provide a 10-bit output, and concatenating an upper 10 bits of the physical page frame number and a lower 12 bits of the offset of the 32-bit linear address with the 10-bit output to provide the 32-bit physical address.

23. The method of claim 22 wherein the translating step further comprises:

performing the adding in parallel with a translation lookaside buffer lookup, wherein an adder device is provided for each fixed 4 megabyte translation lookaside buffer entry for computing addresses in parallel with the translation lookaside buffer lookup.

* * * * *